US009648998B2

(12) United States Patent
Wu

(10) Patent No.: US 9,648,998 B2
(45) Date of Patent: May 16, 2017

(54) COMPOSITE TOILET LID AND SEAT AND METHOD FOR MANUFACTURING

(71) Applicant: Topseat International, Inc., Plano, TX (US)

(72) Inventor: Chengdong Wu, Allen, TX (US)

(73) Assignee: Topseat International, Inc., Plano, TX (US)

( * ) Notice: Subject to any disclaimer, the term of this patent is extended or adjusted under 35 U.S.C. 154(b) by 461 days.

(21) Appl. No.: 14/065,155

(22) Filed: Oct. 28, 2013

(65) Prior Publication Data

US 2014/0047627 A1    Feb. 20, 2014

Related U.S. Application Data

(63) Continuation-in-part of application No. 13/083,161, filed on Apr. 8, 2011.

(51) Int. Cl.
| | |
|---|---|
| *A47K 13/14* | (2006.01) |
| *A47K 13/24* | (2006.01) |
| *A47K 13/02* | (2006.01) |
| *B32B 21/02* | (2006.01) |

(Continued)

(52) U.S. Cl.
CPC ............... *A47K 13/24* (2013.01); *A47K 13/02* (2013.01); *B32B 21/02* (2013.01); *B32B 27/308* (2013.01); *B32B 37/12* (2013.01); *B32B 2307/412* (2013.01); *B32B 2317/12* (2013.01); *B32B 2317/16* (2013.01); *B32B 2333/12* (2013.01); *B32B 2509/00* (2013.01); *Y10T 428/24612* (2015.01); *Y10T 428/24868* (2015.01); *Y10T 428/24884* (2015.01)

(58) Field of Classification Search
CPC ................................ A47K 13/24; A47K 13/02
USPC .................................. 4/242.1, 234, 237
See application file for complete search history.

(56) References Cited

U.S. PATENT DOCUMENTS

| 1,829,526 A | 10/1931 | Leslie |
| 3,484,876 A | 12/1969 | Thomas |
| 5,475,515 A | 12/1995 | Yoshinaga et al. |

(Continued)

FOREIGN PATENT DOCUMENTS

| CN | 2506195 Y | 8/2002 |
| CN | 1422589 A | 6/2003 |

(Continued)

OTHER PUBLICATIONS

Extended European Search Report dated Feb. 16, 2015 in connection with European Patent Application No. 12767262.4; 6 pages.

(Continued)

*Primary Examiner* — Huyen Le

(57) ABSTRACT

A laminar composite toilet lid and seat are formed of a composite laminar material. The toilet lid includes a core structural layer having a shape and size associated with the toilet lid. The toilet lid also includes a first decorative exterior layer disposed on a first surface of the, core structural layer. The toilet lid further includes a second decorative exterior layer disposed on a second surface of the core structural layer, the second surface opposite the first surface. The toilet lid still further includes a painted edge configured to cover seams between the core structural layer and the first and second decorative exterior layers.

20 Claims, 4 Drawing Sheets

(51) Int. Cl.
B32B 27/30 (2006.01)
B32B 37/12 (2006.01)

(56) References Cited

U.S. PATENT DOCUMENTS

| | | | |
|---|---|---|---|
| 5,829,073 A * | 11/1998 | Lee | A47K 13/00 |
| | | | 4/242.1 |
| 5,896,230 A | 4/1999 | Goggins | |
| 8,506,742 B2 | 8/2013 | Terfloth et al. | |
| 2004/0096601 A1 | 5/2004 | Raymond | |
| 2004/0108606 A1 | 6/2004 | Goggins | |
| 2005/0076424 A1 * | 4/2005 | Mattingly | A47K 13/24 |
| | | | 4/242.1 |
| 2005/0120469 A1 | 6/2005 | Benkhardt et al. | |
| 2005/0186393 A1 | 8/2005 | Wilson | |
| 2007/0144659 A1 | 6/2007 | De La Fuente | |
| 2007/0169255 A1 | 7/2007 | Benkhardt et al. | |
| 2007/0298229 A1 | 12/2007 | Rasmusson et al. | |
| 2008/0008885 A1 | 1/2008 | Terfloth et al. | |
| 2009/0068453 A1 | 3/2009 | Chung | |
| 2009/0155593 A1 * | 6/2009 | O'Brien | D21H 17/51 |
| | | | 428/411.1 |
| 2011/0146792 A1 | 6/2011 | Wu et al. | |

FOREIGN PATENT DOCUMENTS

| | | |
|---|---|---|
| CN | 101664289 | 3/2010 |
| CN | 101664289 A | 3/2010 |
| GB | 422797 A | 1/1935 |
| GB | 2021176 A | 11/1979 |
| GB | 2 380 444 A | 4/2003 |
| GB | 2380444 A | 4/2003 |
| WO | WO 2004/110743 A1 | 12/2004 |
| WO | WO 2004110743 A1 | 12/2004 |

OTHER PUBLICATIONS

Communication Pursuant to Rules 70(2) and 70a(2) EPC dated Mar. 5, 2015 in connection with European Patent Application No. 12767262.4; 1 page.
Notification of transmittal of the International Search Report of the International Searching Authority dated Jan. 25, 2013 in connection with International Patent Application No. PCT/US2012/025864.
Written Opinion of the International Searching Authority dated Jan. 25, 2013 in connection with International Patent Application No. PCT/US2012/025864.
U.S. Office Action, dated Sep. 26, 2014, in connection with U.S. Appl. No. 13/083,161; 10 pages.
U.S. Office Action, dated Jul. 1, 2015, in connection with U.S. Appl. No. 13/083,161, 9 pages.
First Office Action dated Mar. 11, 2016 in connection with Chinese Application No. 201280017458.7, 29 pages.
U.S. Office Action issued for U.S. Appl. No. 13/563,093 dated Mar. 11, 2016, 8 pgs.
International Search Report and Written Opinion issued for PCT/US2013/052847 dated Jan. 22, 2014, 9 pgs.
European Office Action issued for EP 12774191.6 dated Apr. 11, 2016, 6 pgs.

\* cited by examiner

COMPOSITE TOILET LID AND SEAT AND METHOD FOR MANUFACTURING

CROSS-REFERENCE TO RELATED APPLICATIONS

This patent application is related to and claims priority under 35 U.S.C. §120 as a continuation-in-part of U.S. patent application Ser. No. 13/083,161 filed on Apr. 8, 2011 for "LAMINAR COMPOSITE TOILET LID AND SEAT," which is hereby incorporated by reference.

TECHNICAL FIELD

This disclosure is generally directed to toilets and more particularly to a toilet lid and seat that are formed of a laminar composite material.

BACKGROUND

Toilet seats and lids have existed in various forms for many decades. A toilet seat provides a surface for an occupant to comfortably sit and a toilet lid provides a protective cover for the toilet facility. Generally, toilet seats and lids are made of wood or plastic materials. These materials can degrade, discolor, and/or become damaged over time. Thus, many toilet seats and lids may become unattractive, structurally unsound, or both. Some toilet seats and lids have decorations and designs in various forms. However, the surfaces of these seats and lids can wear, chip off, degrade, or otherwise become damaged over time.

SUMMARY

According to one embodiment of the present disclosure, a composite laminar material includes a core structural layer, a first decorative exterior layer disposed on a first surface of the core structural layer, and a second decorative exterior layer disposed on a second surface of the core structural layer, the second surface opposite the first surface.

In another embodiment, a toilet lid includes a core structural layer having a shape and size associated with the toilet lid, a first decorative exterior layer disposed on a first surface of the core structural layer, a second decorative exterior layer disposed on a second surface of the core structural layer, the second surface opposite the first surface, and a painted edge configured to cover seams between the core structural layer and the first and second decorative exterior layers.

In still another embodiment, a method of manufacturing a toilet lid includes preparing a core structural layer of the toilet lid, applying a first decorative exterior layer to a first surface of the core structural layer, and applying a second decorative exterior layer to a second surface of the core structural layer, the second surface opposite the first surface.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, described below, and the various embodiments used to describe the principles of the present disclosure in this patent document are by way of illustration only and should not be construed in any way to limit the. scope of the disclosure. Those skilled in the art will understand that the principles of the present disclosure may be implemented in any type of suitably arranged device or system.

The present disclosure provides a laminar composite toilet lid and seat configured to include decorative or aesthetic elements, including elements that have a metallic, embossed, or three-dimensional (3D) appearance. In some embodiments, the toilet lid and seat may have a 3D chrome appearance. The toilet lid and seat according to this disclosure offers many advantages. The decorative or aesthetic elements may convey a message or impression that may be of interest to a user. In addition, the toilet lid and seat according to this disclosure is constructed to be more durable and retain its original appearance for a longer period than conventional toilet lids and seats.

The laminar composite toilet lid and seat according to embodiments of this disclosure is formed of at least three (3) layers of material: a core structural layer, and two exterior layers that may provide both decorative graphic features and a protective finish. The two exterior layers are disposed on top and bottom surfaces of the core structural layer. All of the layers are integrated together to form a durable, attractive product. The decorative graphic features advantageously provide a visually pleasing appearance that conveys a sense of flare and depth to the toilet lid and seat.

Figure 1:
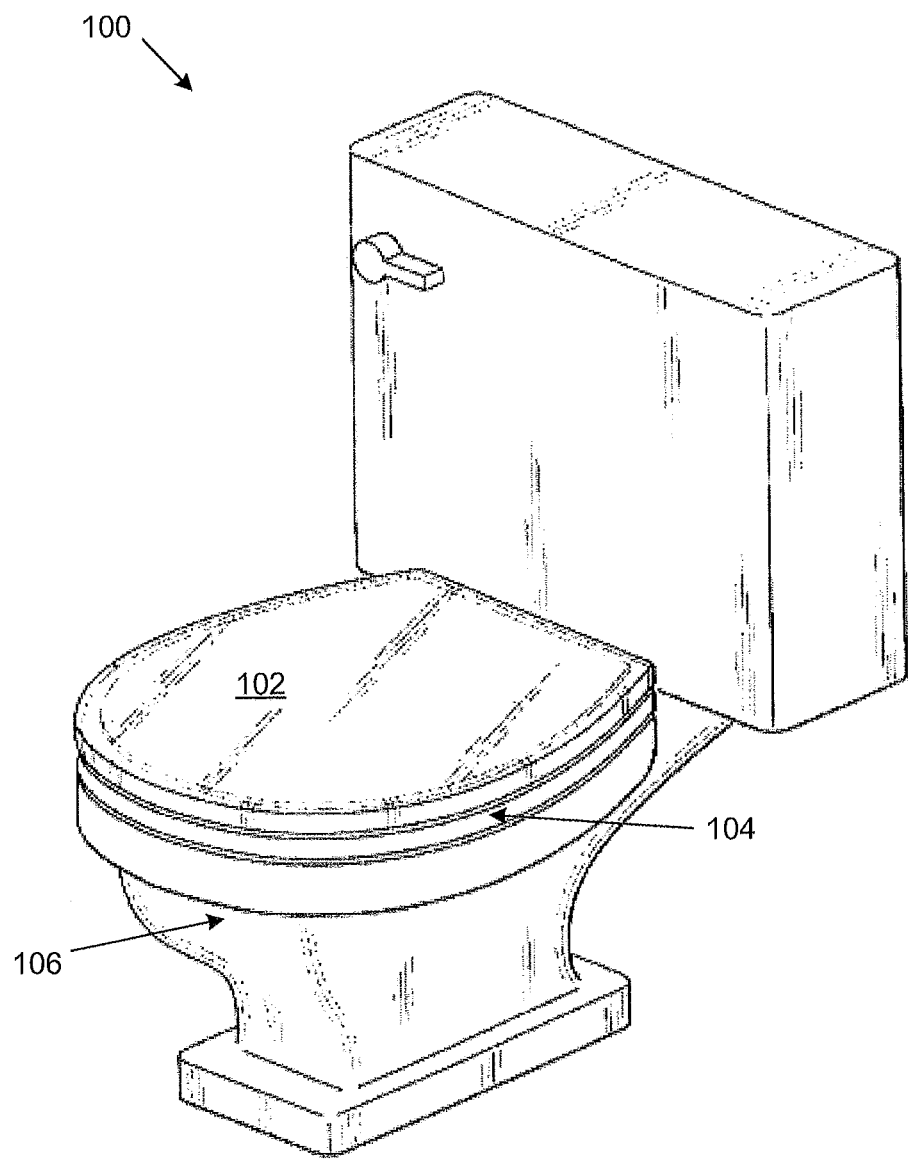
FIG. 1 illustrates a toilet with a laminar composite toilet lid and seat, according to an embodiment of the present disclosure.

FIG. 1 illustrates a toilet with a laminar composite toilet lid and seat, according to an embodiment of the present disclosure. The embodiment of the toilet shown in FIG. 1 is for illustration only. Other embodiments of the toilet could be used without departing from the scope of this disclosure.

As shown in FIG. 1, a toilet 100 is fitted with a toilet lid 102 and toilet seat 104 over a bowl 106. The toilet 100 may be any suitable toilet with a bowl that is configured to be covered by a seat and lid. The bowl 106 has an opening that is generally round or oval in shape. The toilet lid 102 and toilet seat 104 have a size and shape configured to generally match the size and shape of the bowl 106 and to cover the opening of the bowl 106. The toilet lid 102 and toilet seat 104 are secured to a rear portion of the bowl 106 or toilet 100 using hinged hardware that allow the toilet lid 102 and toilet seat 104 to raise and lower independently with respect to the bowl 106 and to each other.

Although FIG. 1 depicts one example of a toilet 100 with a toilet lid 102 and toilet seat 104, various changes may be made to FIG. 1. For example, while the bowl 106 is depicted as generally round or oval in shape, the bowl 106 could include other shapes, such as a rectangle or octagon. Likewise, the toilet lid 102 and toilet seat 104 could also include other shapes in order to match, or be different from, the bowl 106.

Figure 2:
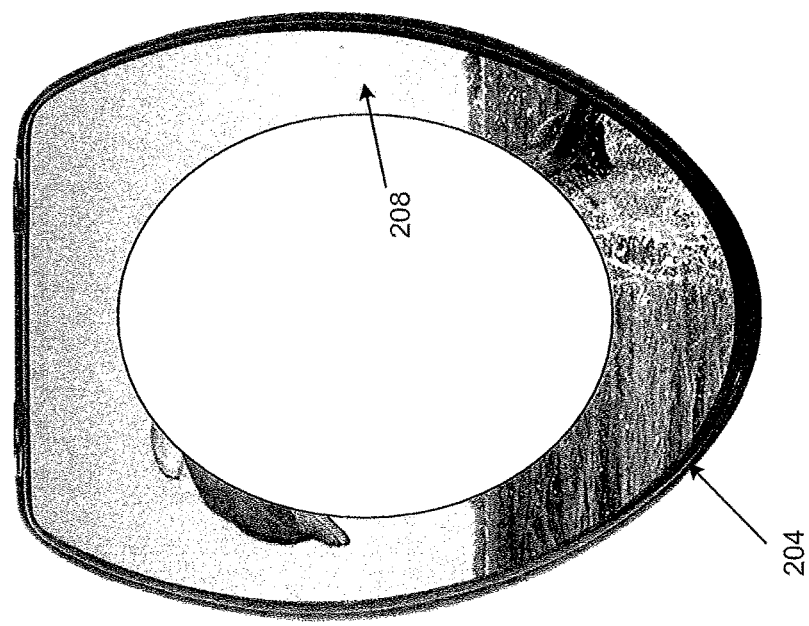
FIG. 2 illustrates top plan views of a laminar composite toilet lid and toilet seat, according to an embodiment of the present disclosure.
Figure 2:
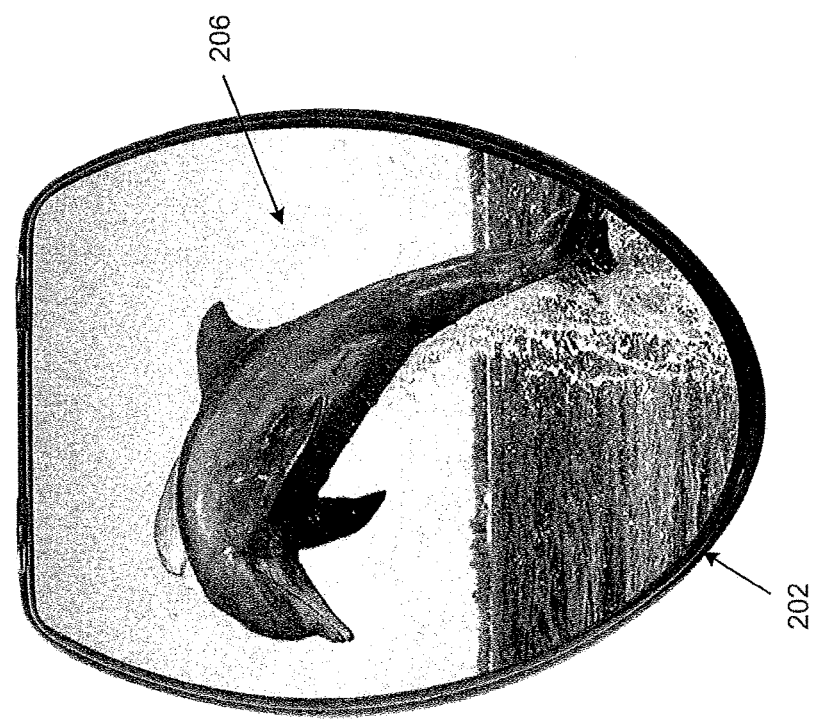

FIG. 2 illustrates top plan views of a laminar composite toilet lid and toilet seat, according to an embodiment of the present disclosure. The embodiment of the toilet lid 202 and toilet seat 204 shown in FIG. 2 is for illustration only. Other embodiments of the toilet lid 202 and seat 204 could be used without departing from the scope of this disclosure. For ease of explanation, the toilet lid 202 and toilet seat 204 may represent the toilet lid 102 and toilet seat 104 of FIG. 1. It will be understood, however, that the toilet lid 202 and toilet seat 204 may represent any other suitable toilet lid and toilet seat.

As shown in FIG. 2, the top surface of the toilet lid 202 includes one or more decorative graphics 206. Likewise, the top surface of the toilet seat 204 includes one or more decorative graphics 208. The decorative graphics 206, 208 may represent any picture, graphic, text, or other image, and are customizable to appeal to a user of a toilet where the toilet lid 202 and seat 204 are installed. The decorative graphics 206, 208 may cover substantially all of the top surface, of the toilet lid 202 and seat 204, or may cover only a portion of the top surface of the toilet lid 202 and seat 204. As described in greater detail below, the decorative graphics 206, 208 may have a 3D metallic appearance.

In certain embodiments, the decorative graphics 206, 208 may be chosen to match or coordinate with a particular decorative scheme of a bathroom or restroom where the toilet is installed. In other embodiments, the decorative graphics 206, 208 may be chosen to display or feature a logo or trademark of a business. In still other embodiments, the decorative graphics 206, 208 may be chosen to display or feature a picture or design that reflects an interest or hobby of a homeowner. The decorative graphics 206, 208 are integrated into the laminar composition of the toilet lid 202 and toilet seat 204, as explained in greater detail below. Thus, the decorative graphics 206, 208 are protected from degradation and wear.

Although FIG. 2 depicts one example of a toilet lid 202 and toilet seat 204, various changes may be made to FIG. 2. For example, while the toilet lid 202 and toilet seat 204 are both shown with decorative graphics, in other embodiments, only one of the toilet lid 202 and toilet seat 204 may include a graphic. As another example, while only the top surfaces of the toilet 202 and toilet seat 204 are shown with a decorative graphic, the bottom surfaces of the toilet lid 202 and/or toilet seat 204 may also include a decorative graphic. As yet another example, while the decorative graphics 206, 208 are depicted as having the same image, in other embodiments, the decorative graphics 206, 208 could include different images or coordinating images.

Figure 3:
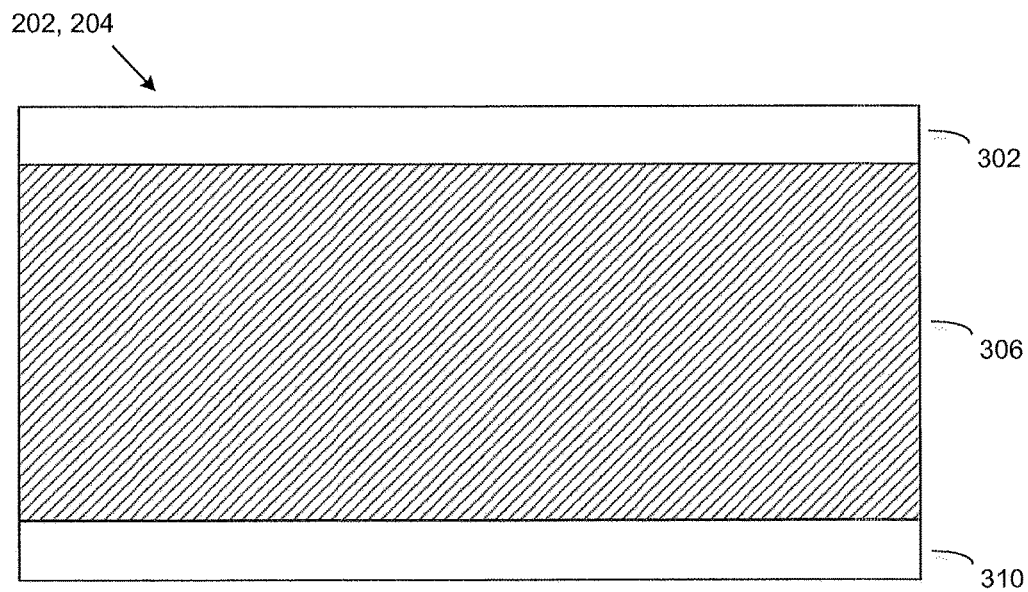
FIG. 3 illustrates a cross-section view of a laminar composite toilet lid or toilet seat, according to an embodiment of the present disclosure.

FIG. 3 illustrates a cross-section view of either the laminar composite toilet lid 202 or the toilet seat 204, according to an embodiment of the present disclosure. The embodiment of the toilet lid 202 or toilet seat 204 shown in FIG. 3 is for illustration only. Other embodiments of the toilet lid 202 or toilet seat 204 could be used without departing from the scope of this disclosure. For ease of explanation, the following disclosure will refer only to the toilet lid 202. However, it will be understood that the embodiments described below are also applicable to the toilet seat 204.

The toilet lid 202 comprises at least three layers 302-310. For clarity of illustration, the thickness of each layer 302-310 may not be drawn to scale. The layer 302 is a decorative exterior layer. The layer 306 is a core structural layer. The layer 310 is a second exterior layer. In certain embodiments, the layer 310 may be identical or substantially similar to the layer 302. In other embodiments, the layer 310 may be composed of a different material than the layer 302.

As described in greater detail below with respect to FIG. 4, the decorative exterior layer 302 is a composite layer with a smooth, clear top surface and a metallic bottom surface. The composite layer 302 includes a top layer of a clear plastic or acrylic material formed over a metallic foil layer. The composite layer 302 may present a 3D appearance when viewed through the top surface.

In some embodiments, each exterior layer 302, 310 is clear and colorless. However, the exterior layers 302, 310 are not limited thereto. For example, either one or both of the exterior layers 302, 310 may be colored, tinted and/or mirrored. Either one or both of the exterior layers 302, 310 may be smooth or textured, and have a glossy or matte finish.

The core layer 306 may be formed of a medium density fiberboard (MDF). As is known in the art, MDF is formed of wood fibers that are held together with one or more waxes or resins such as epoxies, formaldehyde resins, or phenolic resins. The fiber content and thickness of the MDF core layer 306 may vary based on application requirements. The core layer 306 accounts for the majority of the thickness of the toilet lid 202 and provides most of the rigidity of the toilet lid 202. In one embodiment, the thickness of the core layer 306 is approximately nine millimeters (9 mm). In an embodiment, one or both sides of the core layer 306 are painted to hide or protect the finish of the MDF material.

Although the core layer 306 is described as being formed of MDF, other materials may be used. For example, the core layer 306 may be formed of another composite wood, such as hardwood plywood (HWPW), particleboard (PB), high density fiber board (HDF), molded wood, or any other suitable material. In an embodiment, the core layer 306 may be formed of two or more sub-layers, each sub-layer comprising one of the materials described above.

Although FIG. 3 depicts one example of a laminar composite toilet lid 202, various changes may be made to FIG. 3. For example, while shown composed of three layers, the laminar composite toilet lid 202 may include more or fewer than three layers. Layers 302-310 shown in FIG. 3 may be removed, repeated, or arranged in a different order. Each layer 302-310 may be thicker or thinner than depicted in FIG. 3. Each layer 302-310 may include one or more sub-layers. Other layers, composed of the same or different materials, may be added to the laminar composite toilet lid 202.

Figure 4:
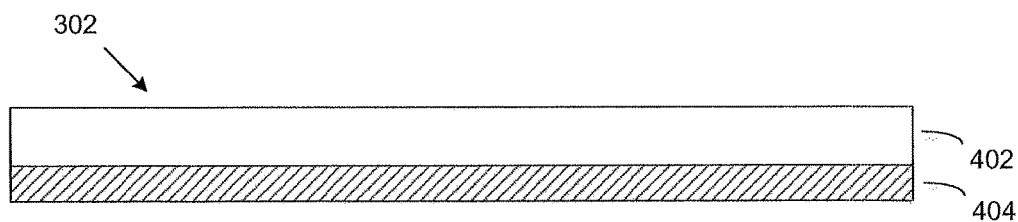
FIG. 4 illustrates a cross-section view of a decorative exterior layer, according to an embodiment of the present disclosure.

FIG. 4 illustrates a cross-section view of the decorative exterior layer 302, according to an embodiment of the present disclosure. The embodiment of the decorative exterior layer 302 shown in FIG. 4 is for illustration only. Other embodiments of the decorative exterior layer 302 could be used without departing from the scope of this disclosure. For ease of explanation, the following disclosure will refer only to the decorative exterior layer 302. However, it will be understood that the embodiments described below may also be applicable to the second exterior layer 310.

As shown in FIG. 4, the decorative exterior layer 302 is a composite layer having two sub-layers 402, 404, The sub-layer 402 is a clear top layer formed of plastic, acrylic, or any other suitable material. The exterior surface of the top sub-layer 402 is preferably smooth, although it could be textured. In a particular embodiment, the top sub-layer 402 is formed of polymethyl-methacrylate (PMMA). PMMA is a transparent, thermoplastic material that is very durable and exhibits excellent optical properties. PMMA is also scratch resistant, can be CNC (computer numerical control) machined, and is more impact resistant than ordinary glass. PMMA is also known by its trade names PLEXIGLASS and LUCITE. The thickness of the top sub-layer 402 may be selected according to the requirements of the application. In one embodiment, the thickness of the top sub-layer 402 is approximately two millimeters (2 mm).

The sub-layer 404 is a thin metallic foil layer that is disposed under the top sub-layer 402. The metallic sub-layer 404 includes one or more etched or embossed portions that provide a 3D appearance when viewed through the clear top sub-layer 402. The etched or embossed portions of the metallic sub-layer 404 may compose one or more 3D images or decorative graphics that convey a message or impression that may be of interest to a user. One or more portions of the metallic sub-layer 404, including the etched or embossed portions, may be colored to enhance the image(s) or decorative graphic(s). The 3D image(s) or decorative graphic(s) provide a visually pleasing appearance that conveys a sense of flare and depth to the toilet lid or seat.

The etching of the metallic foil sub-layer 404 may be achieved using a hot stamping process. Once the metallic foil sub-layer 404 is formed and etched, it is bonded to the top sub-layer 402 to form the decorative exterior layer 302. In some embodiments, the decorative exterior layer 302 is formed using a 3D chrome printing technique such as the OPTICHROME printing technique by OPTIGRAPHICS of Dallas, Tex.

Although FIG. 4 depicts one example of a decorative exterior layer 302, various changes may be made to FIG. 4. For example, while shown composed of two sub-layers, the decorative exterior layer 302 may include more or fewer than two sub-layers. Sub-layers 402, 404 shown in FIG. 4 may be removed, repeated, or arranged in a different order. Each sub-layer 402, 404 may be thicker or thinner than depicted in FIG. 4. Each sub-layer 402, 404 may include one or more additional sub-layers. Other layers, composed of the same or different materials, may be added to the decorative exterior layer 302.

Figure 5:
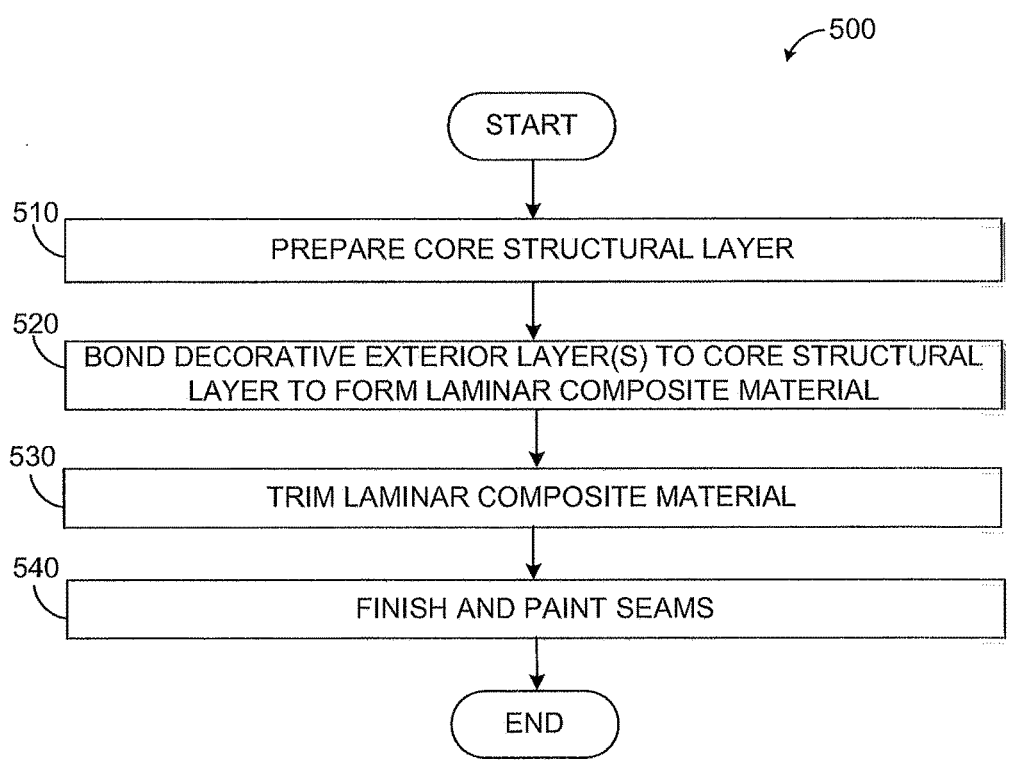
FIG. 5 depicts a method for manufacturing a laminar composite toilet lid and seat, according to an embodiment of the present disclosure.

FIG. 5 depicts a method for manufacturing a laminar composite toilet lid or seat (e.g., toilet lid 202 or toilet seat 204), according to an embodiment of the present disclosure. The method shown in FIG. 5 is for illustration only. Other embodiments of the method could be used without departing from the scope of this disclosure.

First, a core structural layer (e.g., layer 306) is prepared having a size and shape suitable for its application (operation 510). Preparation of the core structural layer may include painting one or more surfaces of the core structural layer.

Next, a decorative exterior layer (e.g., layers 302, 310) is bonded to the top side, bottom side, or both top and bottom sides of the core structural layer to form a laminar composite material (operation 520). The decorative exterior layer includes a 3D metallic sub-layer and a clear top sub-layer. The decorative exterior layer is positioned such that its metallic sub-layer contacts the core structural layer, and its clear top layer faces outward. Each decorative exterior layer is bonded to the core structural layer using an adhesive or heat bonding process. If an adhesive is used, the adhesive may be sprayed on, brushed on, or applied in any other suitable manner.

Next, the laminar composite material is trimmed to match the overall shape of the toilet lid or seat (operation 530). In some embodiments, woodworking machines may be used to cut the core structural layer; however, such machines may not be appropriate for cutting the metallic sub-layer of the decorative exterior layer. In such a case, a die cutting machine may be used to cut the decorative exterior layer separately from the core structural layer.

The trimmed edges of the composite material may reveal seams between the core structural layer and the decorative exterior layer(s). The seams are smoothed, finished, and painted according to known techniques in order to create a smooth transition (operation 540). Once the toilet lid or seat is completed, the decorative exterior layers envelop the toilet lid or seat and provide a protective layer that resists wear and damage, but allows the 3D metallic decorative image or images to be seen.

Although FIG. 5 illustrates one example of a method for manufacturing a laminar composite toilet lid and seat, various changes may be made to FIG. 5. For example, while shown as a series of steps, various steps in FIG. 5 may overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of manufacturing a toilet lid, the method comprising:
    preparing a core structural layer of the toilet lid, the core structural layer comprising a wood-based material;
    bonding a first decorative exterior layer to a first surface of the core structural layer, the first decorative exterior layer having at least one metallic sub-layer;
    bonding a second decorative exterior layer to a second surface of the core structural layer, the second surface opposite the first surface; and
    after the first and second decorative exterior layers are bonded to the core structural layer, trimming the core structural layer and the first and second decorative exterior layers to match an overall shape of the toilet lid, wherein at least the core structural layer is trimmed using a woodworking machine and at least the first decorative exterior layer is trimmed using a die cutting machine.

2. The method of claim 1, wherein:
    the first decorative exterior layer further comprises a clear top sub-layer; and
    the metallic sub-layer of the first decorative exterior layer includes one or more etched or embossed portions that give the first decorative exterior layer a three-dimensional (3D) appearance.

3. The method of claim 2, wherein the one or more etched or embossed portions of the metallic sub-layer form at least one decorative image.

4. The method of claim 3, wherein the one or more etched or embossed portions of the metallic sub-layer are colored such that the at least one decorative image is colored.

5. The method of claim 1, wherein the core structural layer comprises medium density fiberboard (MDF).

6. The method of claim 1, wherein the first and second decorative exterior layers are bonded to the core structural layer using a liquid adhesive.

7. A method of manufacturing a toilet lid, the method comprising:
preparing a core structural layer of the toilet lid, the core structural layer comprising a wood-based material;
preparing a first decorative exterior layer by bonding a clear top sub-layer to a surface of a metallic sub-layer;
bonding the first decorative exterior layer to a first surface of the core structural layer;
bonding a second decorative exterior layer to a second surface of the core structural layer, the second surface opposite the first surface; and
after the first and second decorative exterior layers are bonded to the core structural layer, trimming the core structural layer and the first and second decorative exterior layers to match an overall shape of the toilet lid, wherein at least the core structural layer is trimmed using a woodworking machine and at least the first decorative exterior layer is trimmed using a die cutting machine.

8. The method of claim 7, wherein the metallic sub-layer of the first decorative exterior layer includes one or more etched or embossed portions that give the first decorative exterior layer a three-dimensional (3D) appearance.

9. The method of claim 8, wherein the one or more etched or embossed portions of the metallic sub-layer form at least one decorative image.

10. The method of claim 9, wherein the one or more etched or embossed portions of the metallic sub-layer are colored such that the at least one decorative image is colored.

11. The method of claim 8, wherein the clear top sub-layer comprises polymethyl-methacrylate (PMMA).

12. The method of claim 7, wherein the core structural layer comprises medium density fiberboard (MDF).

13. The method of claim 7, wherein the first and second decorative exterior layers are bonded to the core structural layer using a liquid adhesive.

14. A method of manufacturing a toilet lid, the method comprising:
preparing a core structural layer of the toilet lid, the core structural layer comprising a wood-based material;
preparing a first decorative exterior layer by bonding a clear top sub-layer to a surface of a metallic sub-layer;
bonding the first decorative exterior layer to a first surface of the core structural layer;
bonding a second decorative exterior layer to a second surface of the core structural layer, the second surface opposite the first surface; and
after the first and second decorative exterior layers are bonded to the core structural layer, trimming the core structural layer using a woodworking machine and trimming the first and second decorative exterior layers using a die cutting machine, wherein the core structural layer and the first and second decorative exterior layers are trimmed to match an overall shape of the toilet lid.

15. The method of claim 14, wherein the metallic sub-layer of the first decorative exterior layer includes one or more etched or embossed portions that give the first decorative exterior layer a three-dimensional (3D) appearance.

16. The method of claim 15, wherein the one or more etched or embossed portions of the metallic sub-layer form at least one decorative image.

17. The method of claim 16, wherein the one or more etched or embossed portions of the metallic sub-layer are colored such that the at least one decorative image is colored.

18. The method of claim 15, wherein the clear top sub-layer comprises polymethyl-methacrylate (PMMA).

19. The method of claim 14, wherein the core structural layer comprises medium density fiberboard (MDF).

20. The method of claim 14, wherein the first and second decorative exterior layers are bonded to the core structural layer using a liquid adhesive.

* * * * *